US010209978B1

(12) United States Patent
Dennis et al.

(10) Patent No.: US 10,209,978 B1
(45) Date of Patent: Feb. 19, 2019

(54) MOBILE APPLICATION INSTALLATION SERVICE ON A MOBILE PHONE

(71) Applicant: Sprint Communications Company L.P., Overland Park, KS (US)

(72) Inventors: Drew T. Dennis, Lenexa, KS (US); M. Jeffrey Stone, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 8 days.

(21) Appl. No.: 15/669,890

(22) Filed: Aug. 4, 2017

(51) Int. Cl.
*G06F 3/0482* (2013.01)
*H04W 88/02* (2009.01)
*G06F 8/61* (2018.01)
*H04L 29/08* (2006.01)
*H04W 4/60* (2018.01)
*H04W 84/04* (2009.01)
*H04W 84/12* (2009.01)
*H04W 88/08* (2009.01)

(52) U.S. Cl.
CPC .............. *G06F 8/61* (2013.01); *G06F 3/0482* (2013.01); *H04L 67/34* (2013.01); *H04W 4/60* (2018.02); *H04W 84/042* (2013.01); *H04W 84/12* (2013.01); *H04W 88/02* (2013.01); *H04W 88/08* (2013.01)

(58) Field of Classification Search
CPC ........................................................ G06F 8/61
USPC ........................................................ 717/178
See application file for complete search history.

(56) References Cited

U.S. PATENT DOCUMENTS

| | | | |
|---|---|---|---|
| 8,509,741 B1* | 8/2013 | Gailloux ........... | H04M 3/42144 455/411 |
| 8,839,388 B2* | 9/2014 | Raleigh ............ | G06Q 10/06375 726/7 |
| 8,929,863 B2* | 1/2015 | Thorn ................... | H04W 12/06 455/411 |
| 2005/0075115 A1* | 4/2005 | Corneille .................. | G06F 8/61 455/456.3 |
| 2013/0139056 A1* | 5/2013 | Borkowski ............. | G06F 9/453 715/705 |

(Continued)

OTHER PUBLICATIONS

Newman et al. "The First 10 Things to Do With a New Android Phone" May 13, 2014, Time, accessed online at <time.com/95948/new-android-phone-guide/> (Year: 2014).*

*Primary Examiner* — James D. Rutten

(57) ABSTRACT

A mobile communication device. The device comprises a processor, a non-transitory memory, and a native application stored in the non-transitory memory. When executed by the processor the application receives notification that a network connectivity status of the device changed, starts a timer, in response to expiration of the timer, presents a notification that provides access to get-started information, stores a state of the notification in the non-transitory memory, receives an input selecting the notification, presents a get-started grid comprising selection options, receives an input selecting a selection option, in response to receiving the input selecting a selection option, presents a notification associated with the selection option, stores a state of the selection option in the non-transitory memory, in response to receiving an input selecting the notification associated with the selection option, presents a screen for performing the function associated with the selection option.

20 Claims, 10 Drawing Sheets

(56) References Cited

U.S. PATENT DOCUMENTS

| | | | | |
|---|---|---|---|---|
| 2015/0007167 | A1* | 1/2015 | Mody | G06F 8/61 |
| | | | | 717/176 |
| 2016/0373928 | A1* | 12/2016 | Devarayanigari | H04W 12/06 |
| 2017/0359761 | A1* | 12/2017 | Manepalli | H04W 36/14 |
| 2018/0192346 | A1* | 7/2018 | Nagasaka | H04W 28/08 |

* cited by examiner

MOBILE APPLICATION INSTALLATION SERVICE ON A MOBILE PHONE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones are widely deployed and have become very functional devices. When initially obtained (e.g., when first purchased or received), a mobile phone may be activated. The process of activation includes configuring authorization credentials into the phone and into network servers in one or more wireless communication networks. The process of activation may include configuring premium communication services on the mobile phone. The process of activation may include downloading personal contacts from a central data store or transferred from a previous mobile phone. Many users download mobile applications after initial purchase of their phones to customize and extend the functionality of their phones. Mobile applications may comprise gaming mobile applications, social networking mobile applications, news feed mobile applications, and others.

SUMMARY

In an embodiment, a method of installing mobile applications on a mobile communication device is disclosed. The method comprises registering with an operating system of a mobile communication device by a native application to receive notifications when a network connectivity status of the mobile communication device changes, receiving notification by the native application that the network connectivity status of the mobile communication device changed, and in response to the notification of the change of network connectivity status, starting a timer by the native application to notify the native application when a predefined period of time passes. The method further comprises, in response to expiration of the timer, presenting a get-started notification on a display of the mobile communication device by the native application, wherein the get-started notification provides access to get-started information, storing a state of the get-started notification in a non-transitory portion of a memory of the mobile communication device by the native application, receiving an input selecting the get-started notification, in response to receiving the input selecting the get-started notification, presenting a get-started grid by the native application on the display, where the grid provides selection options comprising one or more of a tutorial selection, a content feed selection, or a mobile application installation selection, and receiving an input selecting a selection option. The method further comprises, in response to receiving the input selecting a selection option, presenting a notification associated with the selection option by the native application on the display, storing a state of the selection option by the native application in the non-transitory portion of the memory, receiving an input selecting the notification associated with the selection option, in response to receiving the input selecting the notification associated with the selection option, presenting a screen for performing the function associated with the selection option by the native application, and one of presenting a selected tutorial in a display of the mobile communication device, configuring a content feed on the mobile communication device, or downloading and installing a mobile application on the mobile communication device, whereby a user is enabled to select at least one of a tutorial selection, a content feed selection, or a mobile application installation while deferring performance of the function associated with the selection option to a time suitable to the user.

In another embodiment, a mobile communication device is disclosed. The mobile communication device comprises a processor, a non-transitory memory, and a native application stored in the non-transitory memory. When executed by the processor, the native application registers with an operating system of a mobile communication device to receive notifications when a network connectivity status of the mobile communication device changes, receives notification that the network connectivity status of the mobile communication device changed, and in response to notification of the change of network connectivity status, starts a timer to notify the native application when a predefined period of time passes. The native application further, in response to expiration of the timer, presents a get-started notification on a display of the mobile communication device, wherein the get-started notification provides access to get-started information, stores a state of the get-started notification in the non-transitory memory of the mobile communication device, receives an input selecting the get-started notification, in response to the input selecting the get-started notification, presents a get-started grid on the display, where the grid provides selection options comprising one or more of a tutorial selection, a content feed selection, and a mobile application installation selection, receives an input selecting a selection option, and, in response to receiving the input selecting a selection option, presents a notification associated with the selection option on the display. The native application further stores a state of the selection option in the non-transitory memory, receives an input selecting the notification associated with the selection option, in response to receiving the input selecting the notification associated with the selection option, presents a screen for performing the function associated with the selection option, and one of presents a selected tutorial in a display of the mobile communication device, configures a content feed on the mobile communication device, or downloads and installs a mobile application on the mobile communication device.

In yet another embodiment, a method of installing mobile applications on a mobile communication device is disclosed. The method comprises registering with an operating system of a mobile communication device by a native application to receive notifications when a network connectivity status of the mobile communication device changes, receiving notification by the native application that the network connectivity status of the mobile communication device changed, in response to the notification of the change of network connectivity status, starting a timer by the native application to notify the native application when a predefined period of time passes, in response to expiration of the timer, presenting an initial notification on a display of the mobile communication device by the native application, wherein the initial notification provides access to initial information, and storing a state of the initial notification in a non-transitory portion of a memory of the mobile communication device by the native application. The method further comprises receiving an input selecting the initial notification, in response to receiving the input selecting the initial notification, presenting an initial grid by the native application on the display, where the grid provides selection options comprising one or more of a tutorial selection, a content feed selection, or a mobile application installation selection, receiving an input selecting a selection option, and, in response to receiving the input selecting a selection option, presenting a notification associated with the selection option by the native application on the display. The method further comprises storing a state of the selection option by the native application in the non-transitory portion of the memory, after storing the state of the initial notification and the state of the selection option in the non-transitory portion of the memory, powering off the mobile communication device, after powering off the mobile communication device, powering on the mobile communication device, after powering on the mobile communication device, reading the state of the initial notification and the state of the selection option from the non-transitory portion of the memory by the native application, and after reading the state of the selection option in the non-transitory portion of the memory, re-presenting the initial notification on the display based on the state of the selection option in the non-transitory memory, whereby a user enabled to select at least one of a tutorial selection, a content feed selection, or a mobile application installation while deferring performance of the function associated with the selection option to a time suitable to the user.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
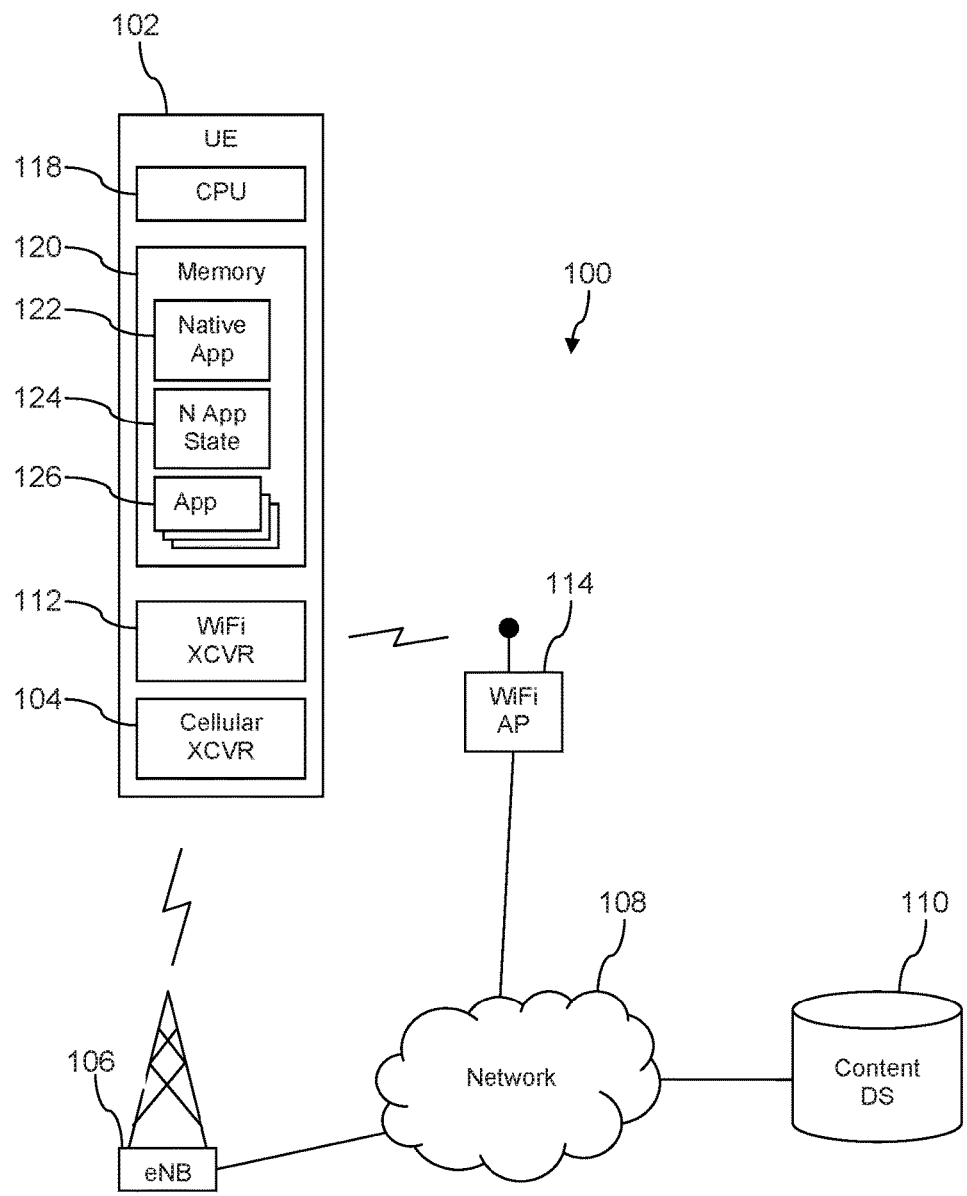
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Activation of mobile communication devices, for example "smart phones," can be a time consuming process as the activation wizard walks the user through the activation process and prompts the user over and over and over again to reply whether they want a laundry list of mobile applications activated on his or her phone. The mobile communication device activation process involves a variety of actions, including configuring credentials into the device for use in authenticating the device into a radio access network (RAN) on the event of the device requesting a wireless communication network. Activation may further comprise copying over user data such as contact information, text message history, and other artifacts from a previous mobile communication device. Activation may further comprise installing mobile applications onto the mobile communication device. Many users, after first obtaining a new device, want to be able to use their device to learn its capabilities and use some of its features. Spending time up-front (e.g., before beginning to use their device) to download mobile applications, to respond to a prompt asking them to approve access privileges the applications request, as in current activation processes, delays the user being able to use his or her device.

The present disclosure teaches a "get-started" native application that provides a variety of mobile application installation services that provides a technical solution to the problem of delayed completion of the activation process and more generally to the problem of complicated and time consuming installation of mobile applications on a mobile communication device. The get-started application is installed on the mobile communication device as a native application. As a native application, the get-started application has access to privileged operating system services. The get-started application registers with the operating system of the mobile communication device to receive notifications on changes of network communication status. On the event of receiving notification of network connectivity (i.e., an event that occurs during the activation process when the device has been configured with appropriate RAN authorization credentials), the get-started application may set a timer using a service of the operating system to schedule a delayed action. When the timer fires, the get-started application resumes its execution and presents a bubble notification on the edge of the display screen of the device that prompts the user to click on the bubble to see "get-started" information. The use of the time delay anchored to the event of initial establishment of network connectivity may be set to allow the user to use the phone for a period of time, after completion of the activation process.

A native application is adapted to the hardware of a specific mobile communication device and is installed during the manufacturing process. A native application typically has access to operating system services and to peripheral devices on the mobile communication device that user applications may not be granted access to, for example to avoid untested and/or corrupted user applications from degrading service of the device and/or of a wireless communication network. Said in other words, a native application may be granted operating system access privileges that are greater than the access privileges granted to user installed mobile applications. Native applications may be considered by original equipment manufacturers (OEM) and/or wireless communication service providers to be inherently more secure because the OEM can control the testing of and exercise configuration control over the native applications that they install on the device during manufacturing.

When the "get-started" bubble is selected by the user, a window opens up to present options for selecting actions to get started with the new device. The options may comprise selecting one or more tutorials on features of the new device which can concisely inform the user of the basic functions of the feature and how to use the feature. The options may comprise selecting one or more streamed content feeds for configuration on the new device. The options may comprise selecting one or more mobile applications for installation on the device. The options in the "get-started" screen may be, generally, related to familiarizing a user to their new device and getting the device set-up the way the user would like. The vehicle of the get-started application, however, may be used to support other functionality that is not restricted to a user initially becoming familiar with or setting-up his or her phone.

When the user selects one of the options presented in the "get-started" screen, a separate bubble is spawned and presented on the edge of the display. The user can later dismiss the "get-started" screen and then select the one or more bubbles to complete the action associated with the selected option, for example to read a tutorial associated with a bubble artifact, to configure the device to receive a streamed content feed associated with a bubble artifact, to download and install a mobile application associated with a bubble artifact. By deferring user interaction with the separate bubbles, the user's attention may remain desirably directed to the "get-started" screen rather than distracted and drawn away. This can have the effect of leading the user to identify and select other options that otherwise he or she may overlook. In some contexts, the "get-started" screen may be referred to as an initial screen. Additionally, this may provide a time delay during which the get-started application can accomplish other tasks on behalf of the user, for example downloading tutorial data, initiating preliminary configuration of a content feed, downloading and initiating preliminary installation of a mobile application. Later, when the user has dismissed the "get-started" screen and selects one of the separate bubbles, the response may be more timely. In the event that the user elects to not commit to seeing the tutorial, committing to the content feed, or installing the mobile application, the preliminary steps that were initiated can be backed out by the get-started application without interfering with the use of the device.

The get-started application may be used as a vehicle for providing related functionality after the activation process has been completed. For example, a wireless communication service provider may refresh data associated with the get-started application so that it will occasionally reappear and, when selected, provide information updates, such as updates about newly available tutorials, newly available content feeds, newly available mobile applications. The provider may periodically update the get-started application data and have it redisplayed, whereby to keep the user thinking about trying new features and new mobile applications, for example weekly, monthly, quarterly, or on some other interval. In some contexts, the get-started application data may be referred to as initial application data or initial information.

The specific information technology implementation taught herein interrelates different technical aspects of the mobile communication device and an understanding of the activation process of new mobile communication devices to solve problems with current mobile communication devices. The get-started application and its mobile application installation services can improve the user satisfaction with new mobile communication devices. This can promote some reluctant users to move forwards with purchasing a new device and discontinue use of an older device when they no longer dread the painful process of activating a new device. This, in turn, can relieve the network of problems that may be associated with obsolete and/or older mobile communication devices. Further, this teaching discloses a technical solution that can reduce screen activity and clutter and reduce device memory overload while preserving choices for the user. The technical solution may comprise offloading and/or deferring some activity related to these user choices and application installations to times of lower processor and/or memory utilization and/or to times of lower network traffic, thereby improving the machine operations of the device and/or the network.

Turning now to FIG. 1, a system 100 is described. In an embodiment, the system 100 comprises a mobile communication device 102 (user equipment—UE) that comprises a cellular radio transceiver 104 that establishes a wireless communication link with a cell site 106 and therethrough to the network 108. The network 108 provides access to a content data store 110 as well as to other communication resources to the device 102. In an embodiment, the device 102 further comprises a short range radio transceiver 112 that establishes a wireless communication link with a short range radio access point (AP) 114, and the AP 114 communicatively couples the device 102 to the network 108 and therethrough to other communication resources such as the content data store 110. In an embodiment, the short range radio transceiver 112 is a WiFi radio transceiver and the short range radio AP 114 is a WiFi AP. The mobile communication device 102 may be a mobile phone, a smart phone, a personal digital assistant (PDA), a wearable computer, a headset computer, a laptop computer, a tablet computer, or a notebook computer. The network 108 may comprise one or more private network, one or more public network, or a combination thereof. The cell site 106 may provide a wireless communication link to the cellular radio transceiver 104 according to a long term evolution (LTE), a code division multiple access (CDMA), a global system for mobile communication (GSM), a worldwide interoperability for microwave access (WiMAX) wireless telecommunication protocol or combinations thereof.

The device 102 comprises a processor 118 and a memory 120, where the memory 120 comprises a non-transitory memory portion. In an embodiment, the memory 120 stores a native application 122 and a native application state 124 in the non-transitory memory portion. In some contexts, the native application 122 may be referred to as a "get-started" application. The native application 122 and the native application state 124 may be configured or installed on the device 102 at a time of device manufacture, for example by an original equipment manufacturer (OEM).

At some point in time, for example after the device 102 has been activated for communication on a radio access network (RAN), one or more mobile applications 126 may be downloaded and installed in the non-transitory memory portion of the memory 120. These mobile applications 126 may be referred to in some contexts as user applications or user apps. It is understood that the system 100 comprises any number of mobile communication devices 102, any number of cell sites 106, and any number of short range radio APs 114. The system 100 may comprise any number of content data stores 110.

In an embodiment, the native application 122 registers with an operating system or other facility of the device 102 to be informed of changes in a network connectivity status of the communication device 102. The device 102 may be deemed to have network connectivity when standard cellular communication capabilities are enabled. One skilled in the art will appreciate that a mobile communication device 102 may receive a wireless communication link from the cell site 106 during preliminary stages of wireless communication service activation without the device 102 having standard network connectivity. Said in another way, the device 102 may initially connect to the network 108 for service activation via a restricted communication channel (e.g., a "slot 0" connection offering access only to a "walled garden" or similar restricted domain) that does not grant communication access via the network 108 other than to servers or hosts that are engaged in completing the service activation of the device 102. The device 102 may also be deemed to have network connectivity when it is able to connect to the network 108 via a wireless link to the short range radio AP 114.

When the native application 122 receives notification of a change in network connectivity status, if the status is connected, the native application 122 may access a function or service of the operating system of the device 102 to set-up a timer such that when a predefined period of time expires (such as a time specified by the native application 122 in a system call to the operating system), the native application 122 is notified of timer expiration. In an embodiment, the native application 122 may put itself to sleep while configuring the operating system to "wake" the native application 122 when the timer expires. The timer may be set to a period of time that allows service activation of the device 102, which may be a newly purchased mobile communication device, to complete and further to allow the user of the device 102 to enjoy his or her phone freely for a while. The timer may be set for a time period of 2 hours, 3 hours, 5 hours, or some other period of time.

When the timer expires and the native application 122 executes on the processor 118, it presents a "get-started" notification on a display of the device 102. This "get-started" notification presented on the display may take a variety of graphical forms. In an embodiment, the "get-started" notification is presented as a cloud or bubble, as seen better in FIG. 2, but in another embodiment the notification may be presented in a different graphical form. The "get-started" notification may be presented on an edge of the display, whereby to mitigate the interference of the notification with any other icons that may be presented on the display. The "get-started" notification may be moved about the display screen in response to user input, whereby to access other graphical controls or icons that are directly or nearly directly under the "get-started" notification. In an embodiment, the "get-started" notification may be implemented as a transparent graphical artifact or layer, such that control inputs to the display may be directed not to the "get-started" notification—if it is not proximate to the touch input—but rather directed to an "underlying" control, such as to a different displayed icon or different visible layer of the display. In some contexts, the "get-started" notification may be referred to more generally as an initial notification.

When the user engages with the "get-started" notification by clicking on it, it opens to present information about available "get-started" content (e.g., content related to getting started using the device 102). In an embodiment, a grid of information may be displayed. The user may select individual items of content by clicking on portions of the grid or items listed. When the user selects an item of information, an item notification is presented on the display. The item notification presented on the display may take a variety of graphical forms, including a bubble shape as better seen in FIG. 2. But it is understood the item notifications may be presented in different graphical forms. The user may choose or select some items and disregard (e.g., NOT select) other items. When the user has completed reviewing the grid of items or the list of items, he or she may dismiss the "get-started" screen, and the "get-started" notification may be removed from the display by the native application 122. In some contexts, the "get-started" screen may be referred to as an initial screen.

The "get-started" notification may be persisted on the display until the user has engaged with the notification, for example by clicking on it and browsing or navigating the content provided when the notification is clicked on. If the device 102 is powered off, the "get-started" notification may be re-presented on the display. In an embodiment, a state of the "get-started" notification is stored in the native application state 124 portion in the non-transitory portion of memory. The state may indicate if the native application 122 has been executed before, if the native application 122 has progressed in execution to the point of setting a timer, if the native application 122 has progressed in execution to the point that it has been notified of expiration of the timer. The state may indicate if the "get-started" notification has been presented, if the "get-started" notification has been engaged with by the user, and if the "get-started" notification has been dismissed successfully by the user.

During power on or rebooting of the device 102, the native application 122 reads the native application state 124 and resumes its executing in the state that it was in before the device 102 was powered down or was rebooted. Thus, the user is permitted to advance through the different states of engagement with the native application 122 and the "get-started" notification and the item notifications even when the device 102 reboots or is powered on.

Figure 2:
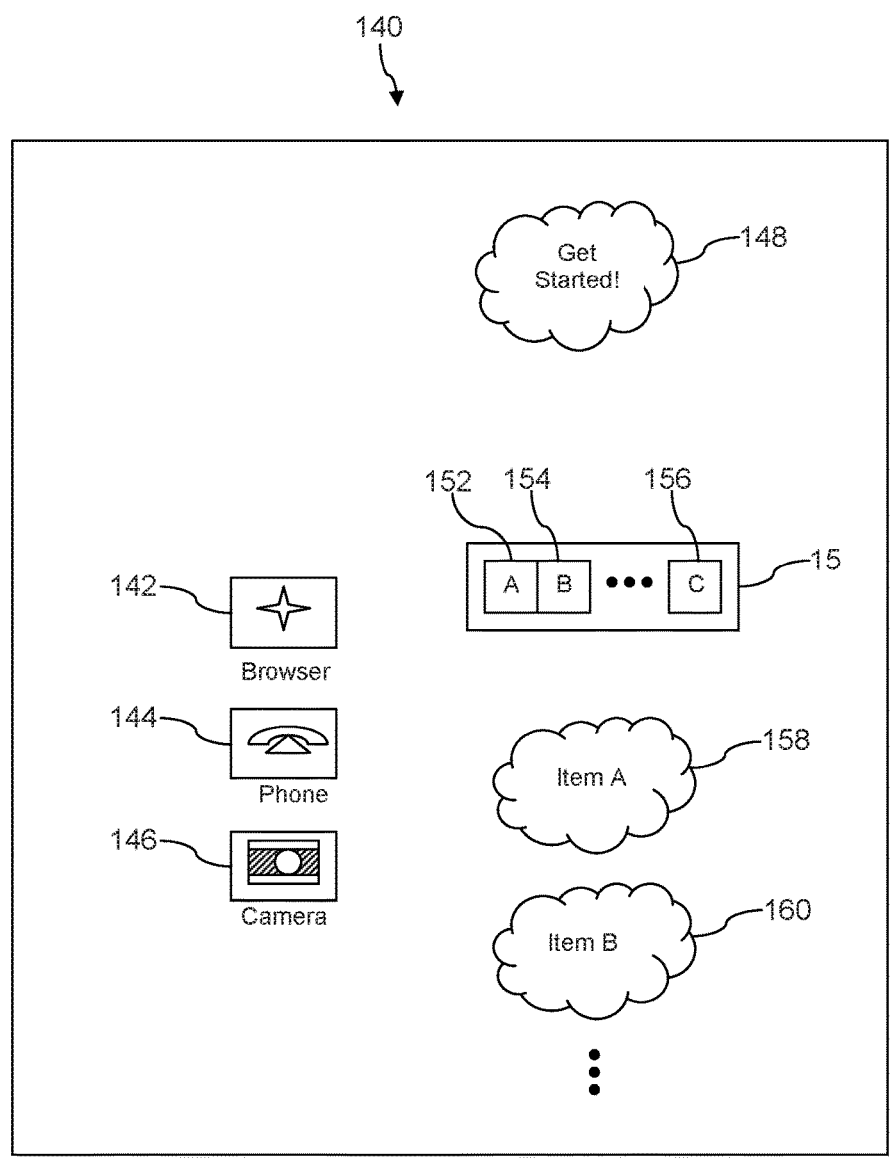
FIG. 2 is an illustration of a display screen of a mobile communication device according to an embodiment of the disclosure.

Turning now to FIG. 2, a display presentation 140 is described. The display presentation 140 comprises a browser icon 142, a phone dialer icon 144, and a camera icon 146. The display presentation 140 further comprises a "get-started" notification 148, a "get-started" grid screen 15, a first item notification 158, and a second item notification 160. The display presentation 140 may vary over time, as the user interacts with the device 102. For example, the user may select different screens and return to screens. In each of these screens, however, the graphic artifacts associated with the native application 122 will be presented, according to the state of the native application 122 as stored by the native application state 124. In some contexts, the "get-started" grid screen may be referred to as an initial grid screen or initial grid.

The "get-started" grid screen 15 may comprise a plurality of selectable items, for example a first item 152, a second item 154, and a third item 156. The selectable items 152, 154, 156 may allow a user to select a corresponding item to be viewed or activated later. The selectable items 152, 154, 156 may present some summary information or a title, such as a subject of a tutorial or a title of a mobile application. When a user selects a selectable item 152, 154, 156, the corresponding item notification 158, 160 is presented in the display presentation 140. The item notifications 158, 160 will remain on the display presentation 140 until the user either activates the notification 158, 160 by clicking on it, which causes the content associated with the selectable item 152, 154, 156 to be retrieved and activated on the device 102. For example, clicking on the notification 158, 160 may cause a tutorial to download and execute on the device 102 or cause a mobile application to download and install on the device.

The native application 122 controls the behavior of the "get-started" notification 148, the "get-started" grid screen 15, and the item notifications 158, 160. Said in another way, the inputs to the "get-started" notification 148, the "get-started" grid screen 15, and the item notifications 158, 160 are sent to the native application 122, and the native application 122 acts on these user inputs accordingly. When a selectable item 152, 154, 156 has been clicked on by the user, the native application 122 may initiate preliminary actions such as downloading content to the memory 120, for example from the content data store 110, and at least partially installing mobile applications on the device 102, whereby to accelerate the response should a user select an item notification 158, 160. If the item notifications 158, 160 are dismissed without final selection, the native application 122 can back-out the preliminary installation steps and delete the content from the memory 120. In an embodiment, the native application 122 may set security settings for a mobile application downloaded to the device 102 based on predefined security profiles associated with the mobile application in an application store.

Figure 3A:
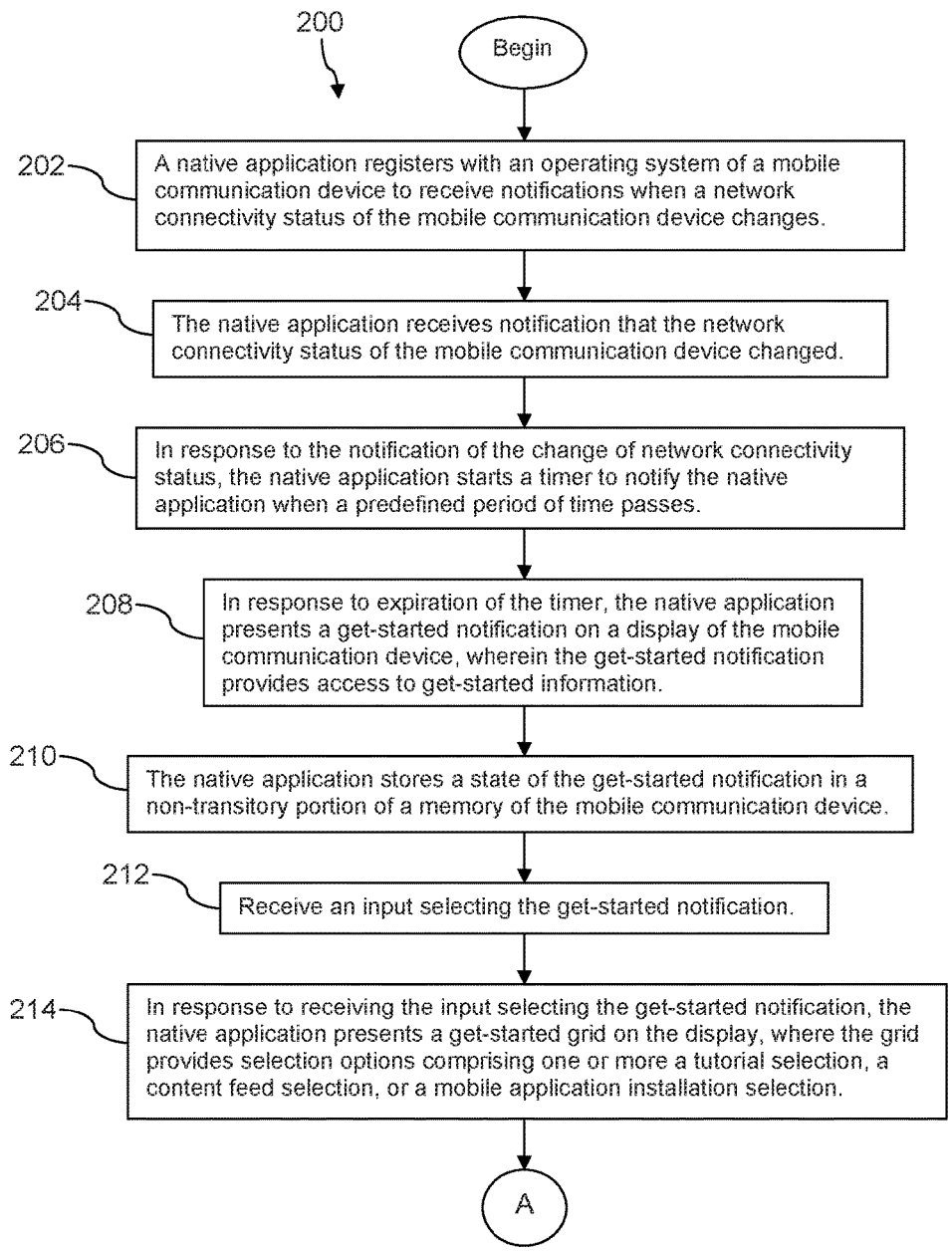
FIG. 3A and FIG. 3B is a flow chart of a method according to an embodiment of the disclosure.
Figure 3B:
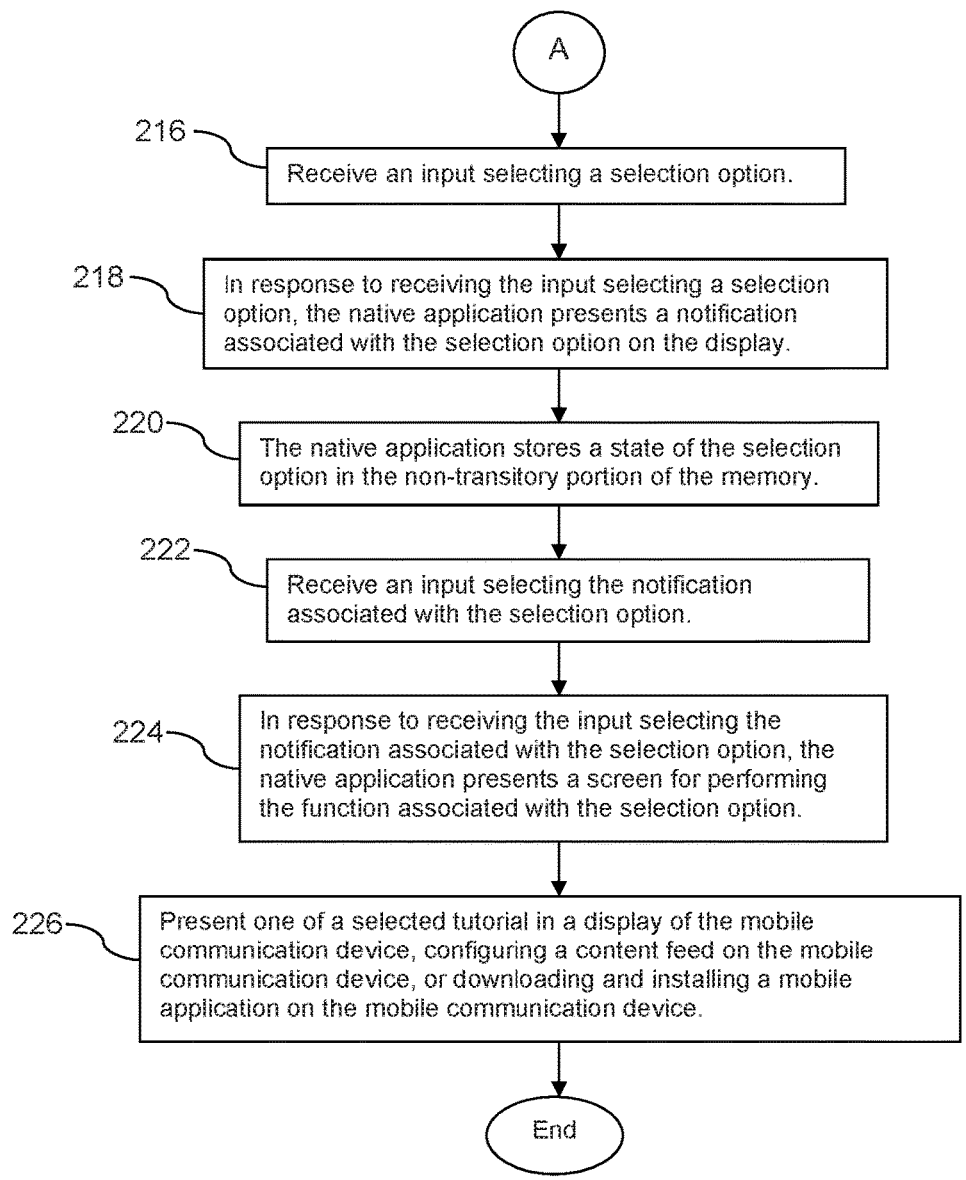

Turning now to FIG. 3A and FIG. 3B, a method 200 is described. The method 200 may be used to install mobile applications on the mobile communication device 102. At block 202, a native application registers with an operating system of a mobile communication device to receive notifications when a network connectivity status of the mobile communication device changes. At block 204, the native application receives notification that the network connectivity status of the mobile communication device changed. At block 206, in response to the notification of the change of network connectivity status, the native application starts a timer to notify the native application when a predefined period of time passes.

At block 208, in response to expiration of the timer, the native application presents a get-started notification on a display of the mobile communication device, wherein the get-started notification provides access to get-started information. At block 210, the native application stores a state of the get-started notification in a non-transitory portion of a memory of the mobile communication device. At block 212, an input is received selecting the get-started notification. At block 214, in response to receiving the input selecting the get-started notification, the native application presents a get-started grid on the display, where the grid provides selection options comprising one or more a tutorial selection, a content feed selection, or a mobile application installation selection.

At block 216, an input is received selecting a selection option. At block 218, in response to receiving the input selecting a selection option, the native application presents a notification associated with the selection option on the display. At block 220, the native application stores a state of the selection option in the non-transitory portion of the memory.

At block 222, an input is received selecting the notification associated with the selection option. At block 224, in response to receiving the input selecting the notification associated with the selection option, the native application presents a screen for performing the function associated with the selection option. At block 226, one of presenting a selected tutorial in a display of the mobile communication device, configuring a content feed on the mobile communication device, or downloading and installing a mobile application on the mobile communication device. The method 200 may enable a user to select at least one of a tutorial selection, a content feed selection, or a mobile application installation while deferring performance of the function associated with the selection option to a time suitable to the user.

Figure 4A:
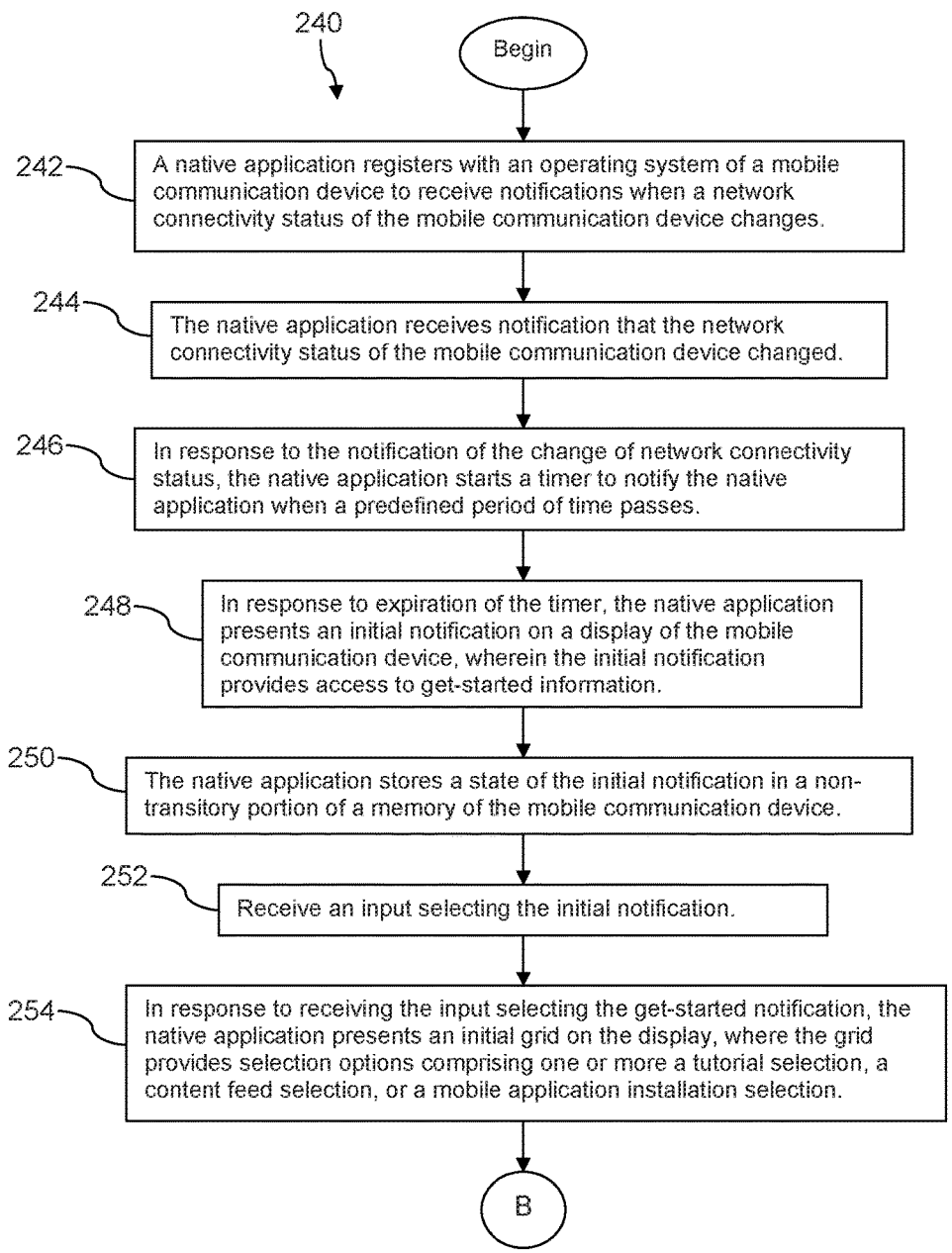
FIG. 4A and FIG. 4B is a flow chart of another method according to an embodiment of the disclosure.
Figure 4B:
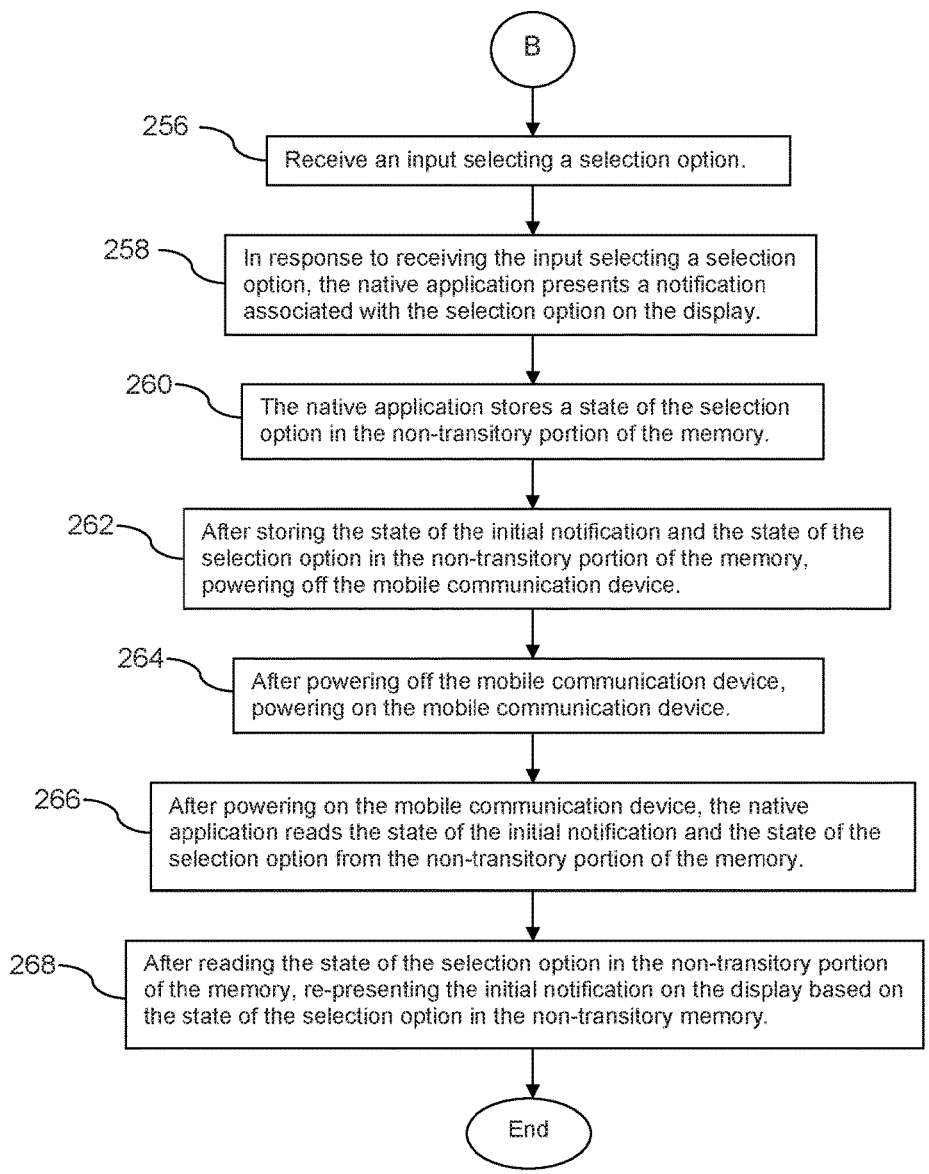

Turning now to FIG. 4A and FIG. 4B, a method 240 is described. The method 240 may be used to install mobile applications on the mobile communication device 102. At block 242, a native application registers with an operating system of a mobile communication device to receive notifications when a network connectivity status of the mobile communication device changes. At block 244, the native application receives notification that the network connectivity status of the mobile communication device changed. At block 246, in response to the notification of the change of network connectivity status, the native application starts a timer to notify the native application when a predefined period of time passes.

At block 248, in response to expiration of the timer, the native application presents an initial notification on a display of the mobile communication device, wherein the initial notification provides access to initial information. At block 250, the native application stores a state of the initial notification in a non-transitory portion of a memory of the mobile communication device. At block 252, an input selecting the initial notification is received.

At block 254, in response to receiving the input selecting the initial notification, the native application presents an initial grid on the display, where the grid provides selection options comprising one or more of a tutorial selection, a content feed selection, or a mobile application installation selection. At block 256, an input selecting a selection option is received. At block 258, in response to receiving the input selecting a selection option, the native application presents a notification associated with the selection option on the display.

At block 260, the native application stores a state of the selection option in the non-transitory portion of the memory. At block 262, after storing the state of the initial notification and the state of the selection option in the non-transitory portion of the memory, the mobile communication device is powered off. At block 264, after powering off the mobile communication device, the mobile communication device is powered on. At block 266, after powering on the mobile communication device, the native application reads the state of the initial notification and the state of the selection option from the non-transitory portion of the memory. At block 268, after reading the state of the selection option in the non-transitory portion of the memory, the initial notification is re-presented on the display based on the state of the selection option in the non-transitory memory. The method 240 may enable a user to select at least one of a tutorial selection, a content feed selection, or a mobile application installation while deferring performance of the function associated with the selection option to a time suitable to the user.

In an embodiment, the method 240 may comprise additional processing that relates to the native application 122 and/or initial information may be refreshed from time to time. For example, a wireless communication service provider may send a refresh package of refresh information to the native application and various states of the native application 122 returned to an initial state. The further processing may comprise the native application receiving refresh information, where the refresh information comprises information about an updated tutorial, newly available content feeds, or newly available mobile applications. The native application may store the refresh information into the initial information, for example into non-transitory portion of the memory 120. After storing the refresh information into the initial information, the native application 122 may store the state of the initial notification as an initial state and store the state of the selection option as an initial state by the native application, for example by writing these state values to the non-transitory portion of the memory 120. After storing the state of the initial notification and storing the state of the selection option as the initial state, the native application 122 may start the timer to notify the native application 122 when the predefined period of time passes. After these processing steps, further processing would resume at block 248 as described further above, but now based on the new information stored in the initial information (e.g., the contents of the refresh information received).

Figure 5:
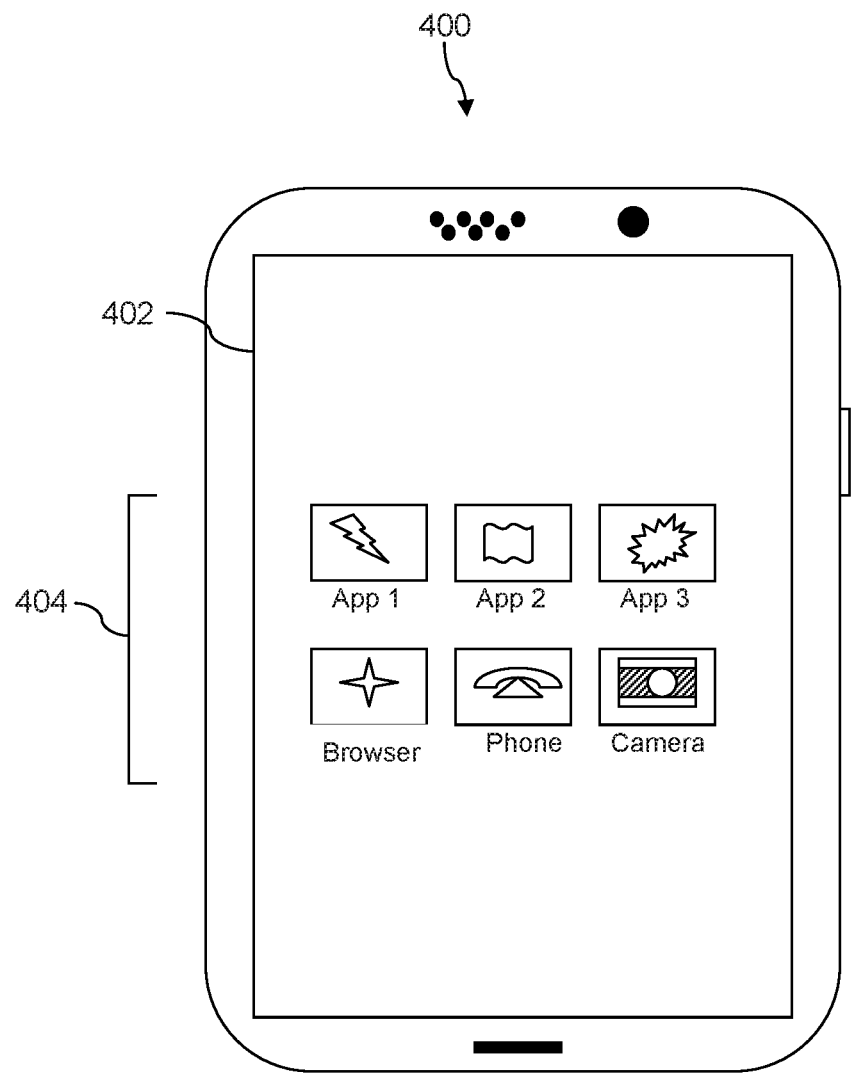
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
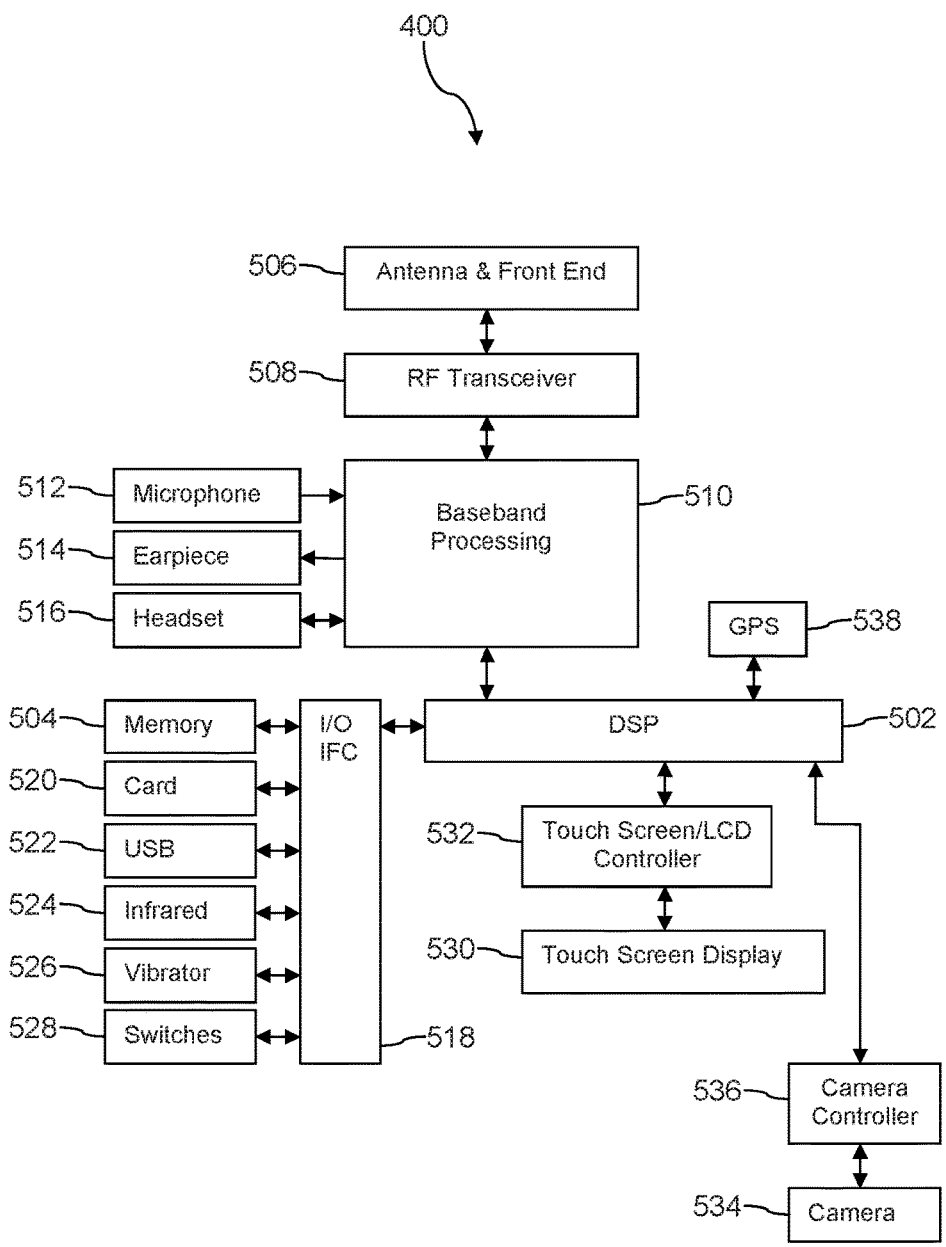
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
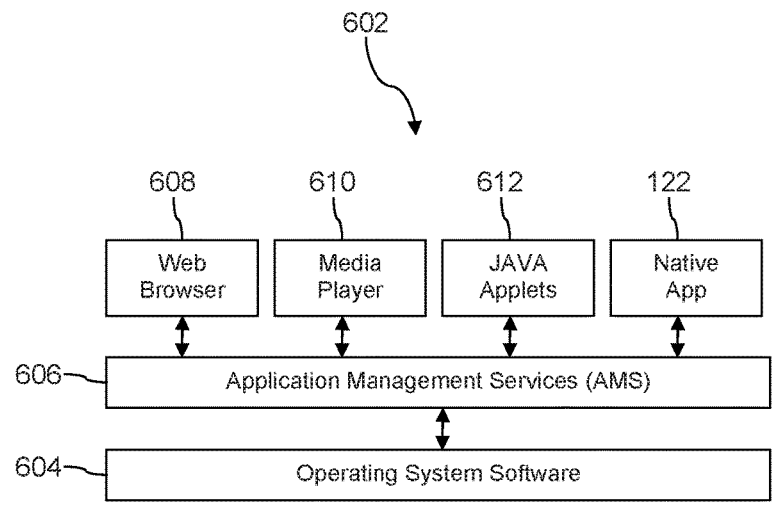
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, JAVA applets 612, and the native application 122. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
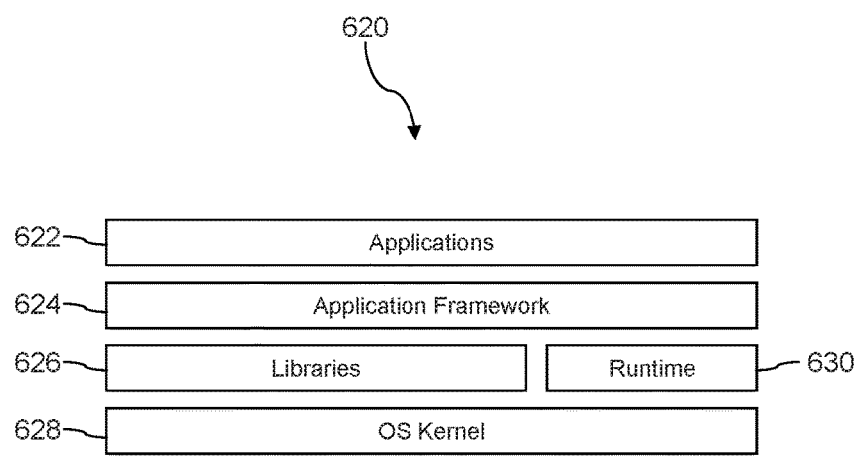
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
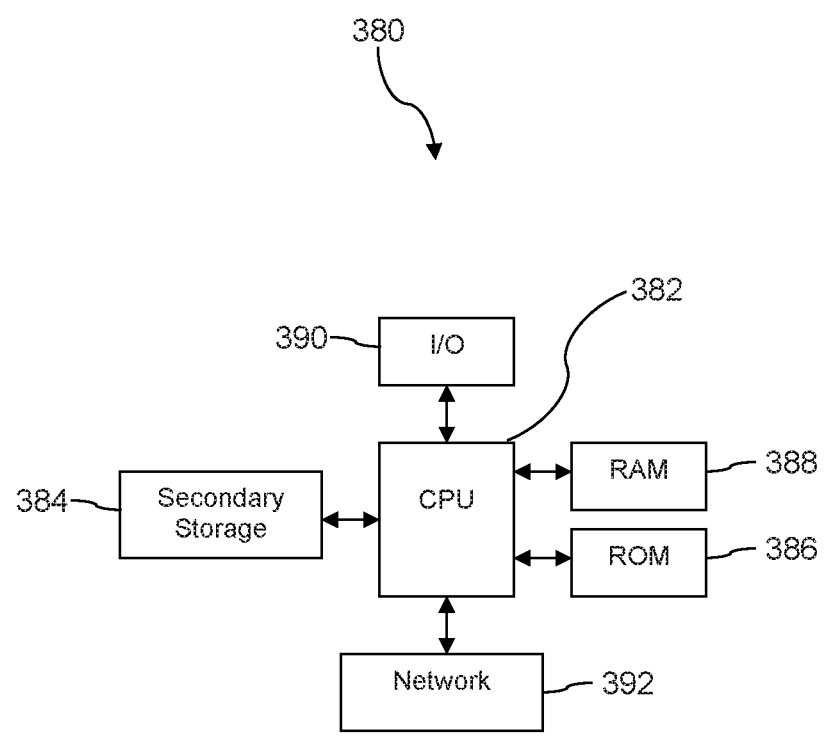
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of installing mobile applications on a mobile communication device, comprising:
registering with an operating system of a mobile communication device by a native application to receive notifications when a network connectivity status of the mobile communication device changes;
receiving notification by the native application that the network connectivity status of the mobile communication device changed;
in response to the notification of the change of network connectivity status, starting a timer by the native application to notify the native application when a predefined period of time passes;
in response to expiration of the timer, presenting a get-started notification on a display of the mobile communication device by the native application, wherein the get-started notification provides access to get-started information;
storing a state of the get-started notification in a non-transitory portion of a memory of the mobile communication device by the native application;
receiving an input selecting the get-started notification;
in response to receiving the input selecting the get-started notification, presenting a get-started grid by the native application on the display, where the grid provides selection options comprising one or more of a tutorial selection, a content feed selection, or a mobile application installation selection;
receiving an input selecting a selection option;
in response to receiving the input selecting a selection option, presenting a notification associated with the selection option by the native application on the display;
storing a state of the selection option by the native application in the non-transitory portion of the memory;
receiving an input selecting the notification associated with the selection option;
in response to receiving the input selecting the notification associated with the selection option, presenting a screen for performing the function associated with the selection option by the native application; and
one of presenting a selected tutorial in a display of the mobile communication device, configuring a content feed on the mobile communication device, or downloading and installing a mobile application on the mobile communication device,
whereby a user is enabled to select at least one of a tutorial selection, a content feed selection, or a mobile application installation while deferring performance of the function associated with the selection option to a time suitable to the user.

2. The method of claim 1, further comprising, in response to receiving the input selecting a selection option, downloading content associated with the selection option by the native application into a memory of the mobile communication device.

3. The method of claim 2, wherein the downloaded content comprises a mobile application, further comprising provisioning security settings of the mobile application by the native application on the mobile communication device.

4. The method of claim 1, further comprising reading the state of the non-transitory portion of the memory to determine a state of the get-started notification and, based on the state, presenting the get-started notification after a reboot of the mobile communication device.

5. The method of claim 1, wherein the get-started notification is presented on the display as a bubble-shaped graphic.

6. The method of claim 5, wherein the bubble-shaped graphic is moveable on the display in response to user input.

7. The method of claim 1, wherein the predefined period of time associated with the timer is at least 2 days.

8. The method of claim 1, wherein the mobile communication device is one of a mobile phone, a smart phone, a personal digital assistant (PDA), a wearable computer, a headset computer, a laptop computer, a tablet computer, or a notebook computer.

9. The method of claim 1, wherein the native application is adapted to the specific mobile communication device and is installed during manufacturing of the mobile communication device.

10. A mobile communication device, comprising:
a processor;
a non-transitory memory; and
a native application stored in the non-transitory memory that, when executed by the processor
registers with an operating system of a mobile communication device to receive notifications when a network connectivity status of the mobile communication device changes,
receives notification that the network connectivity status of the mobile communication device changed,
in response to notification of the change of network connectivity status, starts a timer to notify the native application when a predefined period of time passes,
in response to expiration of the timer, presents a get-started notification on a display of the mobile communication device, wherein the get-started notification provides access to get-started information;
stores a state of the get-started notification in the non-transitory memory of the mobile communication device,
receives an input selecting the get-started notification,
in response to the input selecting the get-started notification, presents a get-started grid on the display, where the grid provides selection options comprising one or more of a tutorial selection, a content feed selection, and a mobile application installation selection,
receives an input selecting a selection option,
in response to receiving the input selecting a selection option, presents a notification associated with the selection option on the display,
stores a state of the selection option in the non-transitory memory;
receives an input selecting the notification associated with the selection option,
in response to receiving the input selecting the notification associated with the selection option, presents a screen for performing the function associated with the selection option, and
one of presents a selected tutorial in a display of the mobile communication device, configures a content feed on the mobile communication device, or downloads and installs a mobile application on the mobile communication device.

11. The mobile communication device of claim 10, wherein the mobile communication device is one of a mobile phone, a smart phone, a personal digital assistant (PDA), a wearable computer, a headset computer, a laptop computer, a tablet computer, or a notebook computer.

12. The mobile communication device of claim 10, further comprising a cellular radio transceiver, and where network connectivity comprises the cellular radio transceiver receiving authentication for use of a standard communication channel.

13. The mobile communication device of claim 12, wherein the cellular radio transceiver is configured to communicate according to one of a long term evolution (LTE), a code division multiple access (CDMA), a global system for mobile communication (GSM), a worldwide interoperability for microwave access (WiMAX) wireless telecommunication protocol or combinations thereof.

14. The mobile communication device of claim 10, further comprising a WiFi radio transceiver, and where network connectivity comprises the WiFi radio transceiver receiving a network connection from a WiFi access point (AP).

15. The mobile communication device of claim 10, where in response to receiving the input selecting a selection option, the native application further downloads content associated with the selection option into the non-transitory memory of the mobile communication device and provisions security settings of the mobile application on the mobile communication device.

16. The mobile communication device of claim 10, where the native application further reads the state of the non-transitory portion of the memory to determine a state of the get-started notification and, based on the state, presents the get-started notification after a reboot of the mobile communication device.

17. The mobile communication device of claim 10, wherein the native application presents the get-started notification on the display as a bubble-shaped graphic.

18. A method of installing mobile applications on a mobile communication device, comprising:
registering with an operating system of a mobile communication device by a native application to receive notifications when a network connectivity status of the mobile communication device changes;
receiving notification by the native application that the network connectivity status of the mobile communication device changed;
in response to the notification of the change of network connectivity status, starting a timer by the native application to notify the native application when a predefined period of time passes;
in response to expiration of the timer, presenting an initial notification on a display of the mobile communication device by the native application, wherein the initial notification provides access to initial information;
storing a state of the initial notification in a non-transitory portion of a memory of the mobile communication device by the native application;
receiving an input selecting the initial notification;
in response to receiving the input selecting the initial notification, presenting an initial grid by the native application on the display, where the grid provides selection options comprising one or more of a tutorial selection, a content feed selection, or a mobile application installation selection;
receiving an input selecting a selection option;
in response to receiving the input selecting a selection option, presenting a notification associated with the selection option by the native application on the display;
storing a state of the selection option by the native application in the non-transitory portion of the memory;
after storing the state of the initial notification and the state of the selection option in the non-transitory portion of the memory, powering off the mobile communication device;
after powering off the mobile communication device, powering on the mobile communication device;
after powering on the mobile communication device, reading the state of the initial notification and the state of the selection option from the non-transitory portion of the memory by the native application;
after reading the state of the selection option in the non-transitory portion of the memory, re-presenting the initial notification on the display based on the state of the selection option in the non-transitory memory;
whereby a user is enabled to select at least one of a tutorial selection, a content feed selection, or a mobile application installation while deferring performance of the function associated with the selection option to a time suitable to the user.

19. The method of claim 18, further comprising after reading the state of the initial notification from the non-transitory portion of the memory, re-presenting the initial notification on the display based on the state of the initial notification in the non-transitory memory.

20. The method of claim 18, further comprising:
receiving refresh information by the native application, where the refresh information comprises information about an updated tutorial, newly available content feeds, or newly available mobile applications;
storing the refresh information into the initial information by the native application;
after storing the refresh information into the initial information, storing a state of the initial notification as an initial state and storing the state of the selection option as an initial state by the native application; and
after storing the state of the initial notification and storing the state of the selection option as the initial state, starting the timer by the native application to notify the native application when the predefined period of time passes,
whereby the native application and initial information is refreshed.

* * * * *